(12) United States Patent
Kawakatsu

(10) Patent No.: US 10,649,387 B2
(45) Date of Patent: May 12, 2020

(54) POWER SUPPLY AND IMAGE FORMING APPARATUS

(71) Applicant: CANON KABUSHIKI KAISHA, Tokyo (JP)

(72) Inventor: Jun Kawakatsu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 652 days.

(21) Appl. No.: 15/376,089

(22) Filed: Dec. 12, 2016

(65) Prior Publication Data
US 2017/0199491 A1    Jul. 13, 2017

(30) Foreign Application Priority Data
Jan. 13, 2016   (JP) .................................. 2016-004746

(51) Int. Cl.
| | | |
|---|---|---|
| G03G 15/00 | (2006.01) | |
| H02M 1/08 | (2006.01) | |
| H02M 3/335 | (2006.01) | |
| H02M 1/00 | (2006.01) | |

(52) U.S. Cl.
CPC .............. *G03G 15/80* (2013.01); *H02M 1/08* (2013.01); *H02M 3/33546* (2013.01); *H02M 2001/0009* (2013.01)

(58) Field of Classification Search
CPC .... G03G 15/80; H02M 3/33546; H02M 1/08; H02M 2001/0009
See application file for complete search history.

(56) References Cited

U.S. PATENT DOCUMENTS

| | | | | |
|---|---|---|---|---|
| 5,442,534 A | * | 8/1995 | Cuk ..................... | H02M 3/005 363/16 |
| 8,743,575 B2 | * | 6/2014 | Nymand ............... | H02M 3/335 363/17 |
| 2011/0311260 A1 | * | 12/2011 | Nakajima ........... | H02M 3/3385 399/88 |
| 2014/0085938 A1 | * | 3/2014 | Shi ..................... | H02M 3/33523 363/21.01 |
| 2014/0362608 A1 | * | 12/2014 | Yang ................. | H02M 3/33576 363/21.01 |
| 2016/0079877 A1 | * | 3/2016 | Lin .................... | H02M 3/33592 363/21.14 |
| 2016/0359419 A1 | * | 12/2016 | Lin ........................ | H02M 1/08 |

FOREIGN PATENT DOCUMENTS

| | | |
|---|---|---|
| JP | 2001-228656 | 8/2001 |
| JP | 2001228656 A * | 8/2001 |

* cited by examiner

*Primary Examiner* — Pinping Sun
(74) *Attorney, Agent, or Firm* — Venable LLP

(57) ABSTRACT

The power supply apparatus comprising a generation unit configured to generate a pulse signal, a memory unit configured to store information set in advance on the driving frequency, and a determination unit configured to determine an error of the input voltage and an error of a load, to a piece of the information stored in the memory unit, a driving frequency detected by the detection unit under a state where a load is connected to the convertor, and based on a result of comparing, to a piece of the information stored in the memory unit, a driving frequency detected by the detection unit under a state where the load is not connected to the convertor.

12 Claims, 8 Drawing Sheets

POWER SUPPLY AND IMAGE FORMING APPARATUS

BACKGROUND OF THE INVENTION

Field of the Invention

The present invention relates to a power supply and an image forming apparatus, and more particularly, to an image forming apparatus including a convertor configured to change output power by controlling a driving frequency.

Description of the Related Art

Hitherto, there is proposed a power supply including a convertor configured to change output power by controlling a driving frequency. A known example of such kind of power supply is a power supply including a voltage detection circuit on an input end of the apparatus to detect an input error, and including a current detection circuit on an output side of the apparatus to detect a load error. In Japanese Patent Application Laid-Open No. 2001-228656, there is described a method of detecting an input voltage by measuring a driving frequency at a predetermined timing. However, circumstances surrounding power sources are diversifying due to recent rise of emerging countries, and there is a demand for a method of detecting an input error or a load error at low costs.

SUMMARY OF THE INVENTION

A purpose of the present invention is to make detection of an input error or a load error at low costs. A purpose of the present invention is to provide a power supply apparatus including a transformer configured to isolate a primary side from a secondary side and being configured to convert an input voltage into an output voltage different from the input voltage and to supply the output voltage to a load, the power supply apparatus being configured to change the output voltage through control of a driving frequency of the transformer, the power supply apparatus further including a generation unit configured to generate a pulse signal based on a voltage induced on the secondary side of the transformer; a detection unit configured to detect the driving frequency based on the pulse signal generated by the generation unit; a memory unit configured to store information set in advance on the driving frequency; and a determination unit configured to determine one of an error of the input voltage and an error of the load based on a result of comparing, to a piece of the information stored in the memory unit, a driving frequency detected by the detection unit under a state where the load is connected to the convertor, and based on a result of comparing, to a piece of the information stored in the memory unit, a driving frequency detected by the detection unit under a state where the load is not connected to the convertor.

In order to solve the above-mentioned problem, the present invention has the following configuration. According to one embodiment of the present invention, there is provided an image forming apparatus including an image forming unit configured to form an image on a recording material, and a power supply apparatus for supplying power to the image forming apparatus, the power supply apparatus including a transformer configured to isolate a primary side from a secondary side and being configured to convert an input voltage into an output voltage different from the input voltage and to supply the output voltage to a load, the power supply apparatus being configured to change the output voltage through control of a driving frequency of the transformer, the power supply apparatus further including a generation unit configured to generate a pulse signal based on a voltage induced on the secondary side of the transformer; a detection unit configured to detect the driving frequency based on the pulse signal generated by the generation unit; a memory unit configured to store information set in advance on the driving frequency; and a determination unit configured to determine one of an error of the input voltage and an error of the load based on a result of comparing, to a piece of the information stored in the memory unit, a driving frequency detected by the detection unit under a state where the load is connected to the convertor, and based on a result of comparing, to a piece of the information stored in the memory unit, a driving frequency detected by the detection unit under a state where the load is not connected to the convertor.

Further features of the present invention will become apparent from the following description of exemplary embodiments with reference to the attached drawings.

DESCRIPTION OF THE EMBODIMENTS

Now, modes for carrying out the present invention are described in detail below by way of embodiments with reference to the drawings.

Now, a first embodiment of the present invention is described.

[Image Forming Apparatus]

Figure 1A:
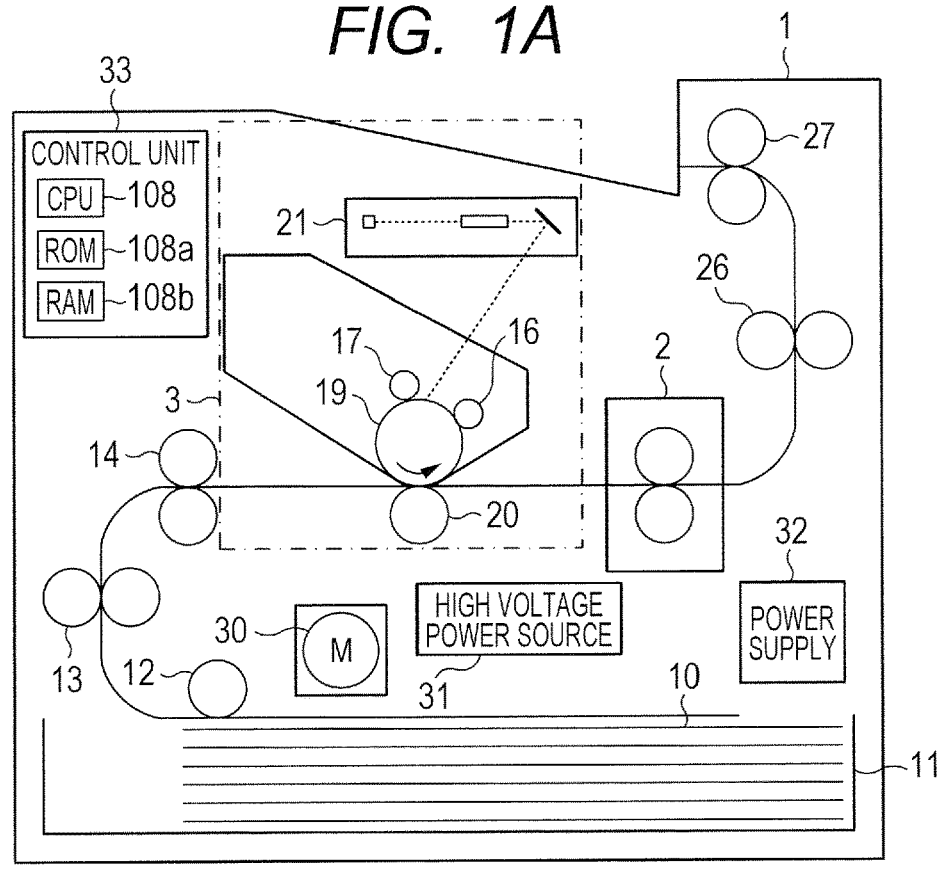
FIG. 1A and FIG. 1B are a diagram for illustrating an overall configuration of an image forming apparatus according to first and second embodiments of the present invention, and a diagram for illustrating a power supply configuration of the image forming apparatus according to the first and second embodiments, respectively.

FIG. 1A is a schematic diagram for illustrating a printer 1, which is an image forming apparatus according to the first embodiment. In the printer 1, generation of a print signal causes a scanner unit 21, which is a part of an image forming unit 3 indicated by the long dashed short dashed line, to radiate laser light that is modulated depending on image information, and to scan a photosensitive drum 19 that is charged to a certain polarity by a charging roller 16. As a result, an electrostatic latent image is formed on the photosensitive drum 19. A developing device 17 supplies toner to the electrostatic latent image formed on the photosensitive drum 19, and a toner image is formed on the photosensitive drum 19 depending on the image information.

Meanwhile, a pickup roller 12 feeds a sheet 10, which is a recording material loaded on a sheet feeding cassette 11 serving as a sheet feeding portion, one by one and a roller 13 conveys the sheet 10 to a registration roller 14. Further, the sheet 10 is conveyed from the registration roller 14 in synchronization with the timing of the toner image formed on the photosensitive drum 19 reaching a transfer nip portion formed by the photosensitive drum 19 and a transfer roller 20. While the sheet 10 passes through the transfer nip portion, the toner image formed on the photosensitive drum 19 is transferred onto the sheet 10. After that, the sheet 10 is heated by a fixing device 2, and the toner image is fixed onto the sheet 10. The sheet 10 carrying the fixed toner image is delivered by rollers 26 and 27 serving as delivery portions to a tray that is on the upper side of the printer 1. A motor 30 is configured to drive the photosensitive drum 19 and the fixing device 2. Further, a high voltage power source 31 is configured to apply high voltages to the charging roller 16, the developing device 17, and the transfer roller 20. A power supply 32 is configured to supply electric power to an electrical circuit such as the motor 30, the high voltage power source 31, or the scanner unit 21.

The printer 1 according to this embodiment can operate in mainly three kinds of states. Specifically, the printer 1 according to this embodiment can operate in one of a "print state" in which a print operation is carried out, a "stand-by state" in which a print instruction is waited for, and a "sleep state" in which power consumption of the apparatus is suppressed. The printer 1 includes a control unit 33, and the control unit 33 includes a CPU 108, a ROM 108a, and a RAM 108b. The CPU 108 of the control unit 33 is configured to control various operations of the printer 1 by executing various programs stored in the ROM 108a and using the RAM 108b as a work area.

[Power Supply]

Figure 1B:
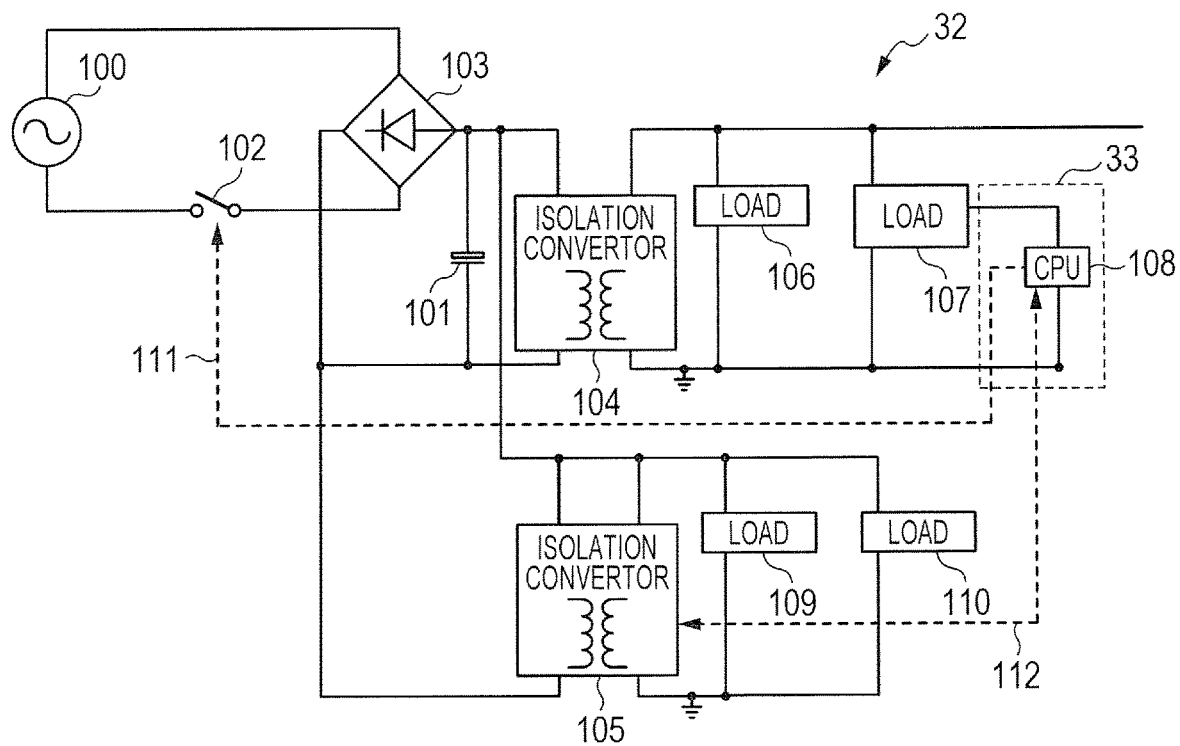

FIG. 1B is a schematic diagram of the power supply 32 according to this embodiment. The AC voltage of an AC power supply 100, e.g., a commercial power supply, is input to a primary smoothing capacitor 101 via a rectifier 103. In the primary smoothing capacitor 101, an isolation convertor 104 and an isolation convertor 105 are connected in parallel with each other. The isolation convertor 104 and the isolation convertor 105 are each a convertor configured to change an output voltage on a secondary side through control of the driving frequency of a switching operation thereof. A load 106 and a load 107 are connected to the isolation convertor 104. The CPU 108 of the control unit 33 is included in the load 107. In this embodiment, the CPU 108 functions as a detection unit configured to detect the driving frequencies of the isolation convertors 104 and 105.

A load 109 and a load 110 are connected to the isolation convertor 105. The load 109 serving as a first load is a load that is connected in a stand-by state and a print state, whereas the load 110 serving as a second load is a load that is connected only in a print state. In other words, the loads 109 and 110 are connected to the isolation convertor 105 in a print state, whereas the load 109 is connected to the isolation convertor 105 in a stand-by state.

An outline of a procedure of determining an input error or a load error of the power supply 32 is as follows. When the printer 1 is in a stand-by state, the CPU 108 detects the driving frequencies at a time when the load 109 is connected to the isolation convertor 105 and at a time when the load 109 is cut off from the isolation convertor 105. The connection and disconnection between the loads 109 and 110 and the isolation convertor 105 may be carried out by using, for example, a known way, e.g., a switch (not shown), and the same holds true for the connection and disconnection between the load 106 and the isolation convertor 104.

The CPU 108 compares the detection result of the driving frequency with an allowable value described later, to thereby determine whether or not the driving frequency is abnormal, and further determine whether the error is an input error or a load error. When the printer 1 is in a print state, the CPU 108 halts printing and shifts to a stand-by state, to further make the same determination as that described above and determine whether or not the error is an input error or a load error. Further, when the CPU 108 halts printing and shifts to a stand-by state, the CPU 108 carries out calibration of the load 110, and determines whether or not the load 110 has a load error. In the calibration of the load 110, for example, when the load 110 is the motor 30, a gear or the like connected to the motor 30 is disconnected to operate the motor 30 alone and measure the driving frequency. The allowable value described later for use in the determination of whether or not the driving frequency is abnormal indicates a range of the driving frequency that the connected load is assumed to take when the driving frequency is measured. Details thereof are described later.

A switch 102 serving as a connection unit configured to connect or disconnect input of an AC voltage to/from the isolation convertors 104 and 105 is connected between the AC power supply 100 and the rectifier 103. The switch 102 is connected to the CPU 108 via a signal line 111, and the CPU 108 is configured to control opening/closing of the switch 102 by outputting an opening/closing signal via the signal line 111. Further, the CPU 108 is connected to the isolation convertor 105 via a signal line 112, and the CPU 108 is configured to control the isolation convertor 105 by inputting/outputting an activation signal or a driving frequency signal of the isolation convertor 105 via the signal line 112.

[Isolation Convertor 105]

Figure 2A:
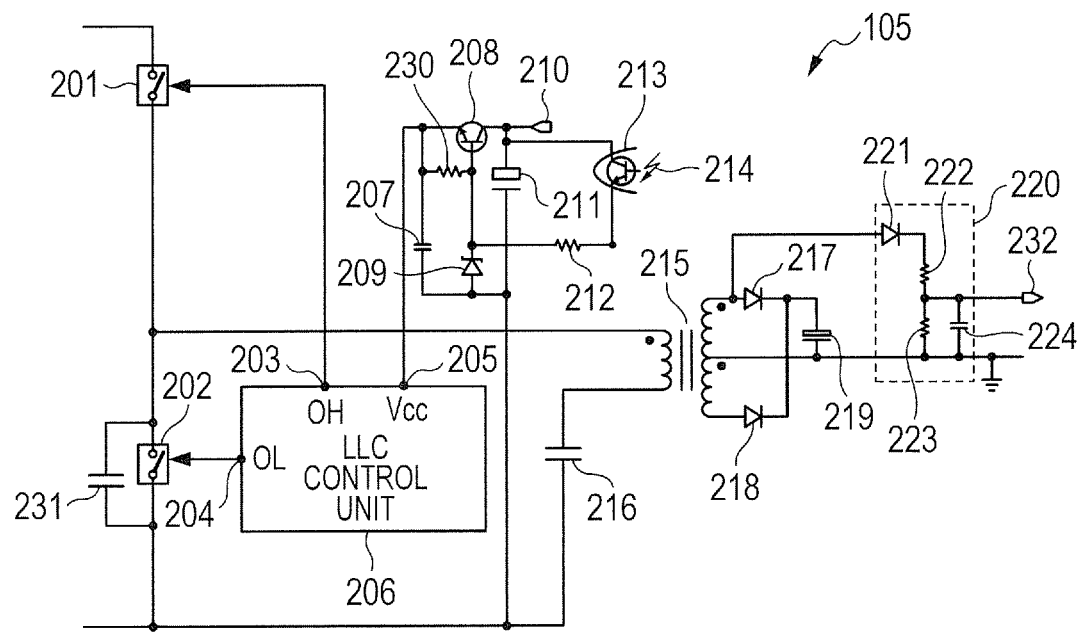
FIG. 2A and FIG. 2B are a diagram for illustrating a convertor according to the first embodiment, and a graph for showing a waveform of input to a driving frequency detection circuit in a stand-by state according to the first embodiment, respectively.

FIG. 2A is a diagram for illustrating details of the isolation convertor 105 serving as a first convertor. The isolation convertor 105 is an LLC convertor. Power for an LLC control unit 206 generated within the isolation convertor 105 is charged to a capacitor 211 via a terminal 210. When an activation signal 214 is input from the CPU 108 via the signal line 112, a phototransistor side of a photocoupler 213 is turned on. With this, a current flows through a resistor 212 and a resistor 230, and a transistor 208 is turned on. A voltage restricted by a Zener diode 209 is supplied to a capacitor 207 and a Vcc terminal 205 serving as a power line of the LLC control unit 206.

The isolation convertor 105 includes a transformer 215 configured to isolate the primary side from the secondary side, and includes switches 201 and 202 serving as switching elements. After a voltage is supplied to the LLC control unit 206 from the Vcc terminal 205, the LLC control unit 206 controls the switch 201 by outputting a high-side switching signal 203 to the switch 201 from an OH terminal. The LLC control unit 206 controls the switch 202 by outputting a low-side switching signal 204 to the switch 202 from an OL terminal. The LLC control unit 206 controls the switching operations of the switches 201 and 202, to thereby supply or cut off electric power to/from the primary side of the transformer 215. The LLC control unit 206 controls the switches 201 and 202 such that currents flow through the transformer 215 and capacitors 216 and 231 to cause electric power to propagate through the secondary side of the transformer 215 and induce a voltage on the secondary side of the transformer 215. When a current flows in a direction of from the transformer 215 to the capacitor 216, a current flows to a capacitor 219 via a diode 217, which is a rectifier element, and is smoothed. In contrast, when a current flows in a direction of from the capacitor 216 to the transformer 215, a current flows to the capacitor 219 via a diode 218, which is a rectifier element, and is smoothed. The anode terminal of the diode 217 is connected to a pulse generation circuit 220, which is a generation unit configured to generate a pulse signal to detect the driving frequency. A voltage is input to the pulse generation circuit 220, which is the voltage induced on the secondary side of the transformer 215 and prior to rectification by the diode 217. The anode terminal of the diode 218 may be connected to the pulse generation circuit 220.

The pulse generation circuit 220 is a circuit for voltage detection, and its input impedance is kept high. The pulse generation circuit 220 is configured to rectify the input voltage by a diode 221, divide the voltage by resistors 222 and 223 and a capacitor 224, and shape the waveform. A terminal 232 of the pulse generation circuit 220 is connected to the CPU 108 via the signal line 112, and the pulse generation circuit 220 is configured to output to the CPU 108 a signal having a waveform synchronized with the switching operation of the isolation convertor 105. With this, the CPU 108 can detect the driving frequency of the isolation convertor 105.

[Pulse Signal Output from Pulse Generation Circuit]

Figure 2B:
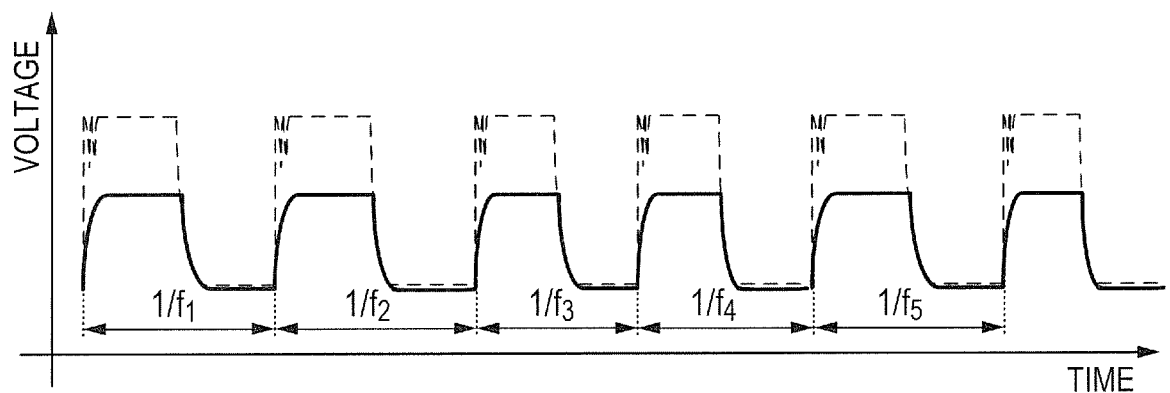

FIG. 2B is an illustration of an example of a waveform of a pulse signal for frequency detection. In FIG. 2B, the horizontal axis represents time, and the vertical axis represents a driving frequency signal to be output to the CPU 108 via the signal line 112. The broken line indicates a waveform on the anode terminal side of the diode 217, and the solid line indicates the waveform of the terminal 232. The CPU 108 is configured to detect driving frequencies $f_1$, $f_2$, $f_3$, $f_4$, and $f_5$ based on the waveform of the driving frequency signal output from the terminal 232. In this case, the average value of driving frequencies of the isolation convertor 105 (hereinafter referred to as "average driving frequency $f_{ave}$") is defined by Expression (1) and a frequency variation width $f\Delta$ is defined by Expression (2). In those expressions, the average driving frequency $f_{ave}$ is defined as a simple average, and the frequency variation width $f\Delta$ is defined as the difference between the maximum value and the minimum value of the driving frequencies. However, the definitions are not limited thereto. Further, a unit of the calculation is not limited to Expression (3) (five period cycle), but may be defined depending on the frequency band used or the frequency gain corresponding to the output. Suffixes 1 to 5 of the driving frequency f of FIG. 2B correspond to X (1 to 5) of Expression (3).

$$f_{ave} = \frac{1}{5}\sum_{t=1}^{5} f_{(t)} \qquad \text{Expression (1)}$$

$$f\Delta = \max\{f_{(t)} \mid t \in X\} - \min\{f_{(t)} \mid t \in X\} \qquad \text{Expression (2)}$$

$$X = \{1, 2, 3, 4, 5\} \qquad \text{Expression (3)}$$

[Error Detection in Stand-by State]

Figure 3:
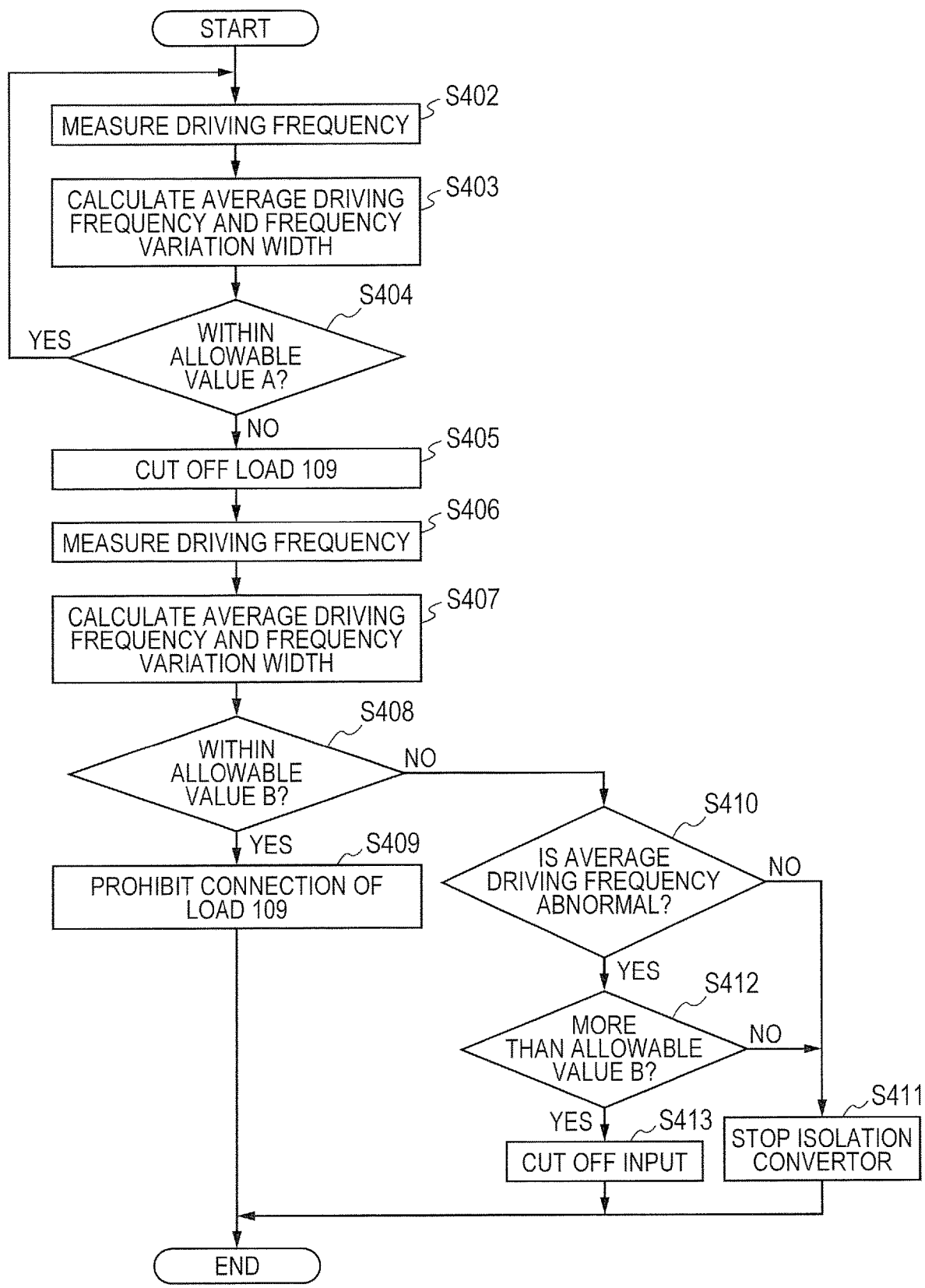
FIG. 3 is a flowchart for illustrating error detection processing in a stand-by state according to the first embodiment.

FIG. 3 is a flowchart for illustrating processing of detecting an error of input to the printer 1 or a load error to be carried out by the CPU 108 under a stand-by state. When the CPU 108 shifts to a stand-by state, the CPU 108 sets the load 109 as only the load connected to the isolation convertor 105, and starts processing from Step (hereinafter abbreviated as S) 402, namely, from S402. In S402, the CPU 108 measures the driving frequency of the isolation convertor 105 based on the driving frequency signal output from the terminal 232 of the pulse generation circuit 220 of the isolation convertor 105. In S403, the CPU 108 calculates, from the measurement result of S402, the average driving frequency $f_{ave}$ and the frequency variation width $f\Delta$ in a state (stand-by state) where only the load 109 is connected, with use of Expression (1) to Expression (3).

In S404, the CPU 108 determines whether or not the average driving frequency $f_{ave}$ and the frequency variation width $f\Delta$ acquired in S403 fall within allowable values A, which are first ranges, respectively. At this time, even when there is no load error or input error, the driving frequency of the isolation convertor 105 takes a predetermined width as a range that can be taken by the driving frequency. Therefore, the allowable value also takes a predetermined range, for example, takes a range of from Amin to Amax. Further, the allowable value A is set for each of the average driving frequency $f_{ave}$ and the frequency variation width $f\Delta$. Specifically, the allowable value A of the average driving frequency $f_{ave}$ is set to, for example, Aave, and the allowable value A of the frequency variation width $f\Delta$ is set to, for example, Af$\Delta$. In the following description, those values are simply referred to as "allowable values A", and the same holds true for other allowable values.

In S404, when the CPU 108 determines that both of the average driving frequency $f_{ave}$ and the frequency variation width $f\Delta$ fall within the allowable values A, respectively, the CPU 108 returns the processing to S402. In this case, the fact that the average driving frequency $f_{ave}$ falls within the allowable value A means that, when the allowable value A takes the range of from Amin to Amax, the average driving frequency $f_{ave}$ falls within the range of from Amin to Amax (Amin≤$f_{ave}$≤Amax). The same holds true for the frequency variation width $f\Delta$. In the following description, the same holds true for other allowable values.

In S404, when the CPU 108 determines that at least one of the average driving frequency $f_{ave}$ and the frequency variation width $f\Delta$ does not fall within the allowable value A, that is, falls outside the allowable value A, the CPU 108 advances the processing to S405. In this case, the fact that the average driving frequency $f_{ave}$ falls outside the allowable value A means that, when the allowable value A takes the range of from Amin to Amax, the average driving frequency $f_{ave}$ falls outside the range of from Amin to Amax ($f_{ave}$<Amin or Amax<$f_{ave}$). The same holds true for the frequency variation width $f\Delta$. In the following description, the same holds true for other allowable values.

In S405, the CPU 108 cuts off the load 109 from the isolation convertor 105. In S406, the CPU 108 measures the driving frequency of the isolation convertor 105 under the state where the load 109 is not connected to the isolation convertor 105. In S407, the CPU 108 calculates the average driving frequency $f_{ave}$ and the frequency variation width $f\Delta$ in a state where the loads 109 and 110 are not connected, from the measurement result of S406 with use of Expression (1) to Expression (3).

In S408, the CPU 108 determines whether or not the average driving frequency $f_{ave}$ and the frequency variation width $f\Delta$ acquired in S407 fall within allowable values B, which are second ranges, respectively. In S408, when the CPU 108 determines that both of the average driving frequency $f_{ave}$ and the frequency variation width fΔ fall within the allowable ranges B, respectively, the CPU 108 advances the processing to S409. In S409, the CPU 108 makes determination in the following manner in view of the fact that the average driving frequency $f_{ave}$ and the frequency variation width fΔ do not fall within the allowable values A, respectively, under the state where the load 109 is connected, and the fact that those values fall within the allowable ranges B after the load 109 is cut off. Specifically, the CPU 108 determines that an error in the load 109 results in the determination of S404 that the average driving frequency $f_{ave}$ and the frequency variation width fΔ in the state where only the load 109 is connected fall outside the allowable values A, respectively. In S409, the CPU 108 prohibits connection of the load 109. In this step, the CPU 108 may alert a user of the load error through, for example, an operational panel (not shown) in addition to prohibiting connection of the load 109.

In S408, when the CPU 108 determines that at least one of the average driving frequency $f_{ave}$ and the frequency variation width fΔ acquired in S407 does not fall within the allowable range B, the CPU 108 advances the processing to S410. This case means that, even when the load 109 is cut off, the driving frequency of the isolation convertor 105 is not in a normal state. In S410, the CPU 108 determines whether or not the average driving frequency $f_{ave}$ falls outside the allowable value B. In S410, when the CPU 108 determines that the average driving frequency $f_{ave}$ falls outside the allowable value B, the CPU 108 advances the processing to S412. In S410, when the CPU 108 determines that the average driving frequency $f_{ave}$ falls within the allowable value B, that is, determines that the frequency variation width fΔ falls outside the allowable range B, the CPU 108 advances the processing to S411. In S411, when the frequency variation width fΔ falls outside the allowable range B, for example, when the difference between the maximum value and the minimum value of the driving frequency is large, the CPU 108 determines that input to the printer 1 is unstable, stops the isolation convertor 105, and ends the processing. The CPU 108 may alert the user of the input error through, for example, the operational panel (not shown) in addition to stopping the isolation convertor 105.

In S412, the CPU 108 determines whether or not the average driving frequency $f_{ave}$ is larger than (exceeds) the maximum value (e.g., Bmax, which is a second value) of the allowable value B. In S412, when the CPU 108 determines that the average driving frequency $f_{ave}$ is not larger than the maximum value of the allowable value B, the CPU 108 advances the processing to S411. The fact that the average driving frequency $f_{ave}$ does not fall within the allowable value B and is not larger than the maximum value of the allowable value B means that the average driving frequency $f_{ave}$ is smaller than the minimum value (e.g., Bmin, which is a first value) of the allowable value B ($f_{ave}$<Bmin). In this case, there may occur a failure in operation of the isolation convertor 105, and thus the CPU 108 stops the isolation convertor 105 in S411. The CPU 108 may alert the user of the input error through, for example, the operational panel (not shown) in addition to stopping the isolation convertor 105.

In S412, when the CPU 108 determines that the average driving frequency $f_{ave}$ is larger than the maximum value of the allowable value B (Bmax<$f_{ave}$), the CPU 108 determines that there may occur a failure not only in the isolation convertor 105 but also in other parts of the printer 1, and advances the processing to S413. In S413, the CPU 108 cuts off input to the image forming apparatus by turning the switch 102 off through the signal line 111. In this manner, the CPU 108 can detect the input error and the load error through the determination of S408 and the subsequent steps.

[Allowable Value A, Allowable Value B]

Next, a description is given of the allowable value A and the allowable value B. The output gain of the isolation convertor 105 (LLC convertor) is represented by Expression (4) in general.

$$G = \frac{1}{\sqrt{\left(S - \frac{S}{F^2} + 1\right)^2 + \frac{1}{Q^2}\left(F - \frac{1}{F}\right)^2}} \quad \text{Expression (4)}$$

$$S = \frac{Ls}{Lp} \quad \text{Expression (5)}$$

$$F = \frac{f}{f0} \quad \text{Expression (6)}$$

In Expression (4) to Expression (6), Ls represents a leakage inductance, Lp represents a mutual inductance, f0 represents a resonance frequency, and f represents a driving frequency. Further, Q represents a function that has a variable of the load.

As can be seen from Expression (4), the driving frequency (F of Expression (4)) of the isolation convertor 105 is determined from parameters of the transformer 215, an input voltage to the isolation convertor 105, namely, an input voltage to the printer 1, and the magnitude of a load connected to the isolation convertor 105. The driving frequency of the isolation convertor 105 is represented by a function having those three variables. Regarding those three variables, the parameters of the transformer 215 and the load in the stand-by state are values that are known at the stage of design of the printer 1. Therefore, although the allowable value A and the allowable value B each have a width, those values can be represented by functions having one variable of the input voltage, thereby enabling utilization of those values as threshold values for determining an input error.

Further, the driving frequency of the isolation convertor 105 when a load corresponding to the load 109 in a stand-by state of the printer 1 is connected is measured in advance under a state where there is no input error or load error. Then, the ranges (namely, allowable values A) in normal states of the average driving frequency $f_{ave}$ and the frequency variation width fΔ are stored in a memory unit, for example, the ROM 108a, based on the measured driving frequency. Similarly, the driving frequency of the isolation convertor 105 when a load corresponding to the load 109 is not connected is also measured, and the allowable values B are stored in, for example, the ROM 108a based on the measured driving frequency. With this, it is possible to improve the determination accuracy of the input voltage. In this case, the allowable value A is a range of the driving frequency that is assumed when the load 109 is connected, that is, the range of the driving frequency that can be taken by the isolation convertor 105 when a load corresponding to the load 109 is connected. Further, the allowable value B is a range of the driving frequency that is assumed when the load 109 is not connected to the isolation convertor 105, namely, a range of the driving frequency that can be taken by the isolation convertor 105 when the load 109 is not connected. As in this embodiment, the allowable value A or other values may be stored in the ROM 108a included in the control unit 33, or may be stored in a memory unit included in the CPU 108, but it is desired that those values be stored in a memory unit within the board of the isolation convertor 105. In this embodiment, a description is given on the assumption that the memory unit is the ROM 108a included in the control unit 33.

As described above, the CPU 108 detects the driving frequencies of the isolation convertor 105 at the times of connection and disconnection of the load 109 under a stand-by state, to thereby be able to detect an input error or a load error at low costs. Further, in this embodiment, the load 109 has been described as one load. However, even when the load 109 is formed of a plurality of loads including a load 109-1, a load 109-2, a load 109-3, and the like, it is possible to determine whether the error is an input error or a load error by detecting the driving frequencies of the isolation convertor 105 at the times of connection and disconnection of each load. In this case, allowable values set in advance for respective loads are stored in the ROM 108a, and the CPU 108 determines an error using those allowable values.

[Error Detection in Print State]

Figure 4:
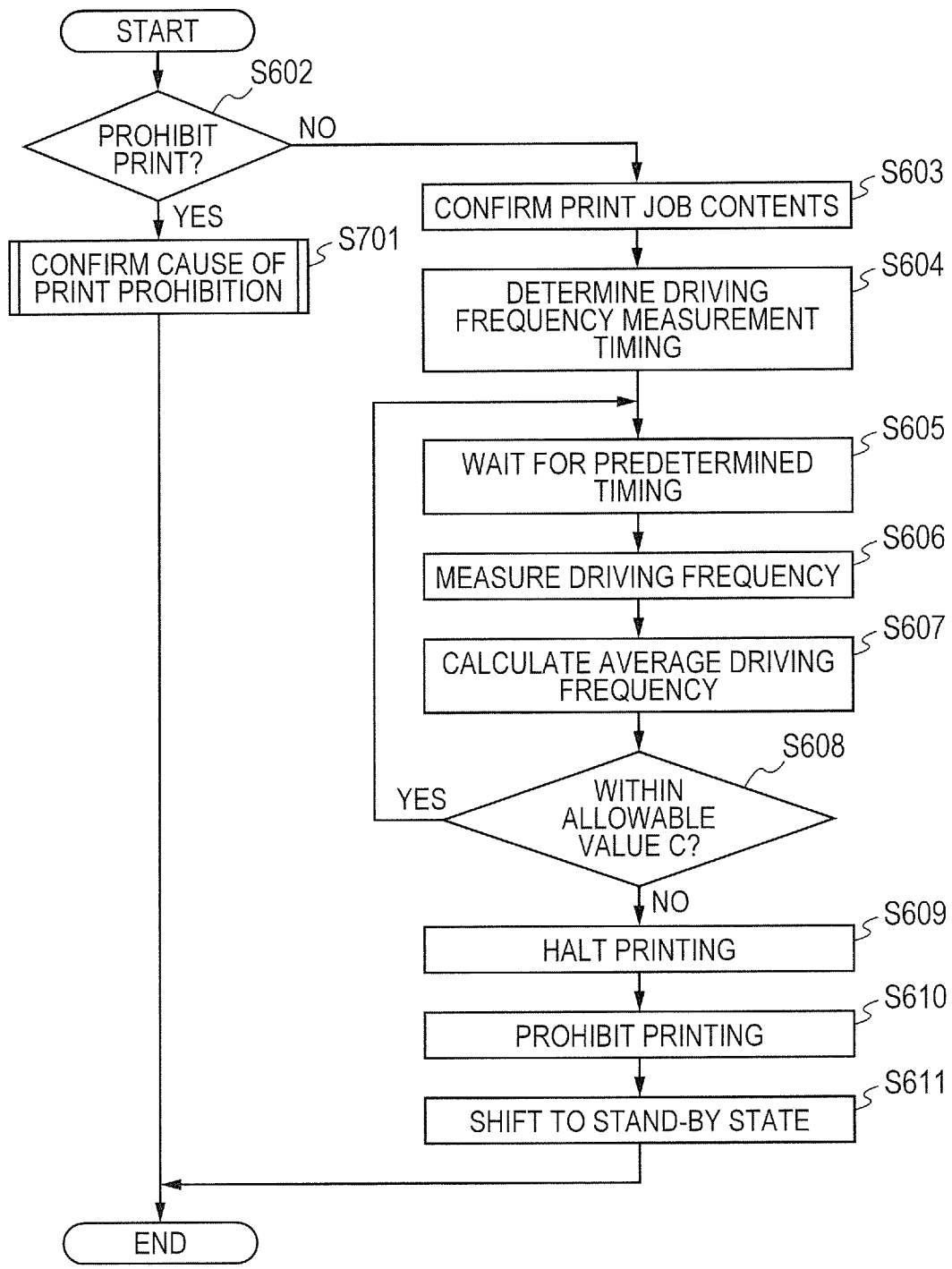
FIG. 4 is a flowchart for illustrating error detection processing in a print state according to the first embodiment.

Next, a description is given of a procedure of detecting an error of input to the printer 1 or a load error to be carried out by the CPU 108 under a print state. FIG. 4 is an illustration of a procedure of detecting an error of input to the printer 1 or a load error to be carried out by the CPU 108 under a print state. When the CPU 108 shifts to a print state, the CPU 108 starts processing from S602. In S602, the CPU 108 confirms whether or not printing is prohibited. In S602, when the CPU 108 determines that printing is prohibited, the CPU 108 advances the processing to S701, and executes processing of confirmation of the cause of print prohibition. The processing of S701 is described later. In S602, when the CPU 108 determines that printing is not prohibited, the CPU 108 advances the processing to S603. In S603, the CPU 108 confirms print job contents.

Figure 5:
FIG. 5 is a graph for showing a waveform of input to the driving frequency detection circuit in a print state according to the first embodiment.

In this case, confirmation of contents of print jobs, which is executed by the CPU 108 in S603, refers to confirmation of items necessary for determining a timing at which the load of the isolation convertor 105 becomes stable, such as the number of sheets or the paper type for printing, or a sheet supply/discharge port. FIG. 5 is an illustration of an example of transition of the driving frequency of the isolation convertor 105 when printing is carried out for one sheet in a case where input voltages are different. The horizontal axis represents time and the vertical axis represents the driving frequency. Further, FIG. 5 is an illustration of a case in which the input voltages are 90 V, 100 V, 120 V, and 130 V. In a print state, the load of the isolation convertor 105 is not stable unlike the case of a stand-by state. However, as represented by a section Ts (double-headed arrow) of FIG. 5, there exists a time frame in which the load is relatively stable and the driving frequency is stable for each of the input voltages. In this embodiment, in a print state, it is possible to detect an input error or a load error for each of the input voltages by measuring the driving frequency of the isolation convertor 105 in a time frame, e.g., the section Ts, in which a load is stable. The CPU 108 determines the timing at which the load becomes stable based on the information of FIG. 5.

In S604, the CPU 108 determines the timing at which the load becomes stable (section Ts of FIG. 5), namely, an appropriate timing for measuring the driving frequency of the isolation convertor 105, from the result of confirmation of contents in S603. In S605, the CPU 108 waits until the timing determined in S604 is reached by, for example, referring to a timer (not shown), and in S606, measures the driving frequency of the isolation convertor 105 under a state where the loads 109 and 110 are connected. In S607, the CPU 108 calculates the average driving frequency $f_{ave}$ and the frequency variation width $f\Delta$ at the time of printing (state where loads 109 and 110 are connected) from the measurement result of S606 with use of Expression (1) to Expression (3). In S608, the CPU 108 determines whether or not the average driving frequency $f_{ave}$ and the frequency variation width $f\Delta$ fall within allowable values C, which are third ranges, respectively. In S608, when the CPU 108 determines that both of the average driving frequency $f_{ave}$ and the frequency variation width $f\Delta$ fall within the allowable ranges C, respectively, the CPU 108 returns the processing to S605.

In S608, when at least one of the average driving frequency $f_{ave}$ and the frequency variation width $f\Delta$ does not fall within the allowable range C, an input error or a load error has occurred, and thus the CPU 108 determines that normal printing cannot be continued, and advances the processing to S609. In S609, the CPU 108 halts printing. The CPU 108 cuts off the load 110 from the isolation convertor 105, and sets a flag indicating that an error is found through detection of the driving frequency at the timing of printing. This flag may be a switch implemented on firmware to be processed by the CPU 108 or a hardware switch. In S610, the CPU 108 prohibits printing. In other words, the CPU 108 prohibits the loads 109 and 110 from being active. In S611, the CPU 108 shifts to a stand-by state described with reference to FIG. 3 to determine whether the error is a load error of the load 109 or an input error.

Similarly to the allowable values A and B, the allowable value C has a width and can be represented by a function having one variable of the input voltage, and thus can be used as a threshold value for determining an input error. For example, the driving frequency of the isolation convertor 105 when loads corresponding to the loads 109 and 110 in a print state of the printer 1 are connected is measured in advance under a state where there is no input error or load error. Then, the ranges (namely, allowable values C) in normal states of the average driving frequency $f_{ave}$ and the frequency variation width $f\Delta$ are stored in a memory unit, for example, the ROM 108a, based on the measured driving frequency. Further, the driving frequency of the isolation convertor 105 that is detected at a predetermined timing of the section Ts of FIG. 5 during printing by the printer 1 is stored in the ROM 108a. In this way, it is possible to improve the determination accuracy of the input voltage.

[Processing of Confirmation of Cause of Print Prohibition]

Figure 6:
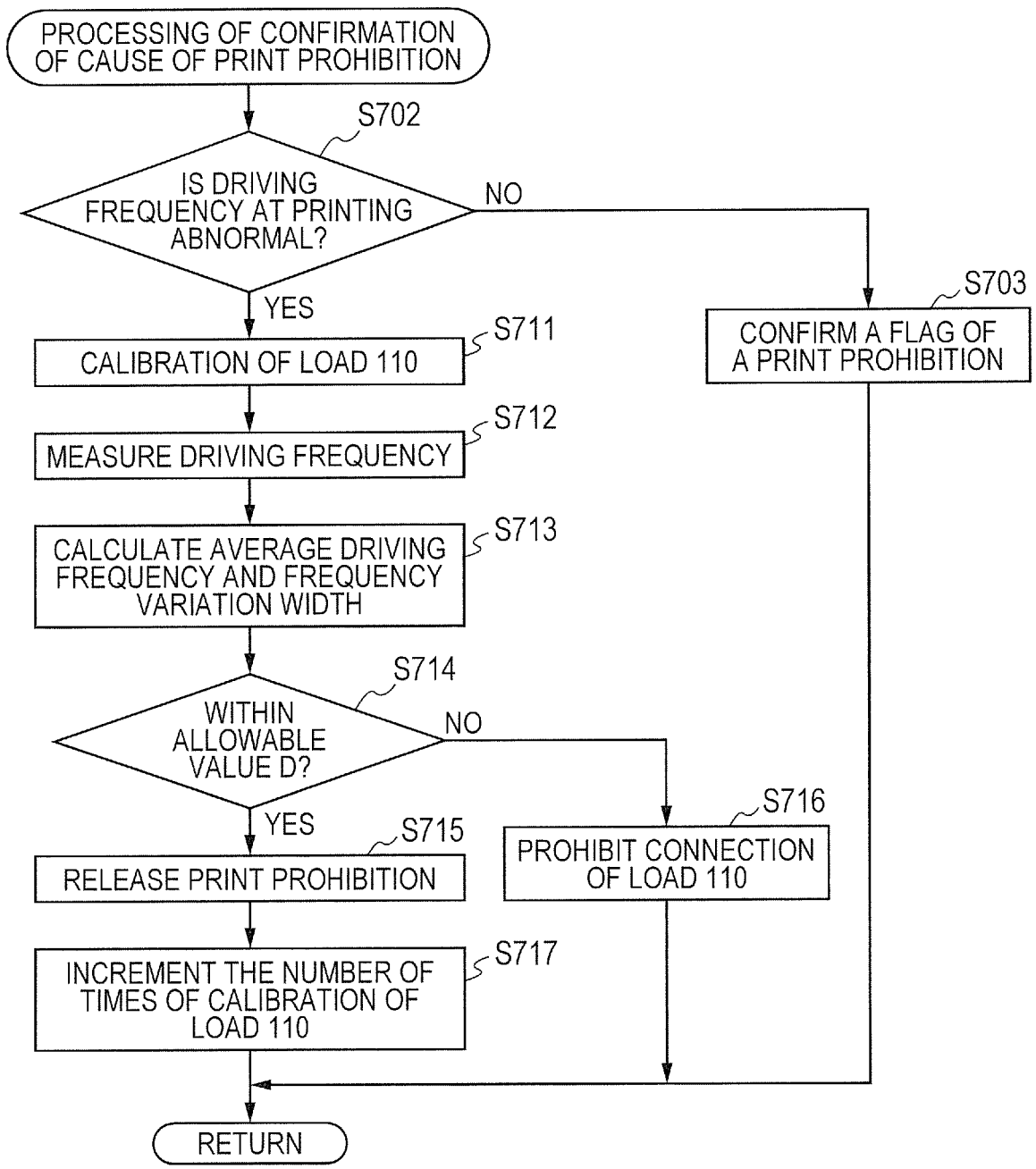
FIG. 6 is a flowchart for illustrating processing of confirmation of cause of print prohibition according to the first embodiment.

A description is now given of a sequence of confirmation of the cause of print prohibition of S701 of FIG. 4 with reference to FIG. 6. When the CPU 108 determines that printing is prohibited in S602 of FIG. 4, the CPU 108 starts processing of confirmation of the cause of print prohibition of FIG. 6. The CPU 108 carries out various kinds of detection, and thus may prohibit printing due to various causes based on those detection results. In S702, the CPU 108 determines whether or not the print prohibition is caused because the value does not fall within the allowable value C in the determination of S608, that is, whether or not the print prohibition is caused because an error is found through detection of the driving frequency at the timing of printing. In S702, when the CPU 108 determines that no error is found through detection of the driving frequency at the time of printing, the CPU 108 advances the processing to S703, and checks other causes based on flag information. The processing of S703 has no relation to processing of detecting an input error or a load error based on the driving frequency, and thus description of details thereof is omitted here.

In S702, when the CPU 108 determines that an error is found through detection of the driving frequency at the time of printing based on flag information, the CPU 108 determines that an input error or a load error has occurred during printing. As described in S408 of FIG. 3, the CPU 108 determines whether or not the error is an input error when shifting to a stand-by state. Therefore, the fact that the CPU 108 has shifted from a stand-by state to a print state and executed the processing until S711 means the possibility of a load error of the load 110. Thus, in S711, the CPU 108 carries out calibration of the load 110 as described above. In S712, the CPU 108 measures the driving frequency of the isolation convertor 105 when the load 110 is calibrated. In S713, the CPU 108 calculates the average driving frequency $f_{ave}$ and the frequency variation width $f\Delta$. In S714, the CPU 108 determines whether or not the average driving frequency $f_{ave}$ and the frequency variation width $f\Delta$ fall within allowable values D, which are fourth ranges, respectively, based on the result of S713.

In S714, when the CPU 108 determines that both of the average driving frequency $f_{ave}$ and the frequency variation width $f\Delta$ fall within the allowable ranges D, respectively, the CPU 108 determines that an error in driving frequency at the time of printing has been determined in S702 because of a temporary input error or load error. In S715, the CPU 108 releases print prohibition, that is, releases prohibition of the loads 109 and 110 being active. In S717, the CPU 108 increments by one a counter configured to count the number of times that the load 110 has been calibrated (hereinafter referred to as "calibration count") in order to store the fact that the load 110 has been calibrated in S711. For example, even in a case where the CPU 108 determines a temporary input error or load error, the CPU 108 may, for example, inform the user of the fact when the calibration count is equal to or more than a predetermined count by referring to the calibration count.

In S714, when at least one of the average driving frequency $f_{ave}$ and the frequency variation width $f\Delta$ does not fall within the allowable range D, the CPU 108 determines that an error in driving frequency at the time of printing has been determined in S702 because the load 110 is abnormal. In S716, the CPU 108 prohibits connection of the load 110.

In this embodiment, the load 110 has been described as one load. However, when the load 110 is formed of a plurality of loads, the driving frequency of the isolation convertor 105 at the time of calibration of each load may be detected. With this, it is possible to determine which load is abnormal. In this case, an allowable value is set for each load. Further, the driving frequency of the isolation convertor 105 when calibration is carried out with connection of a load corresponding to the load 110 in a print state of the printer 1 is measured in advance under the state where there is no input error or load error. Then, the ranges (namely, allowable values D) in normal states of the average driving frequency $f_{ave}$ and the frequency variation width $f\Delta$ are stored in a memory unit, for example, the ROM 108a, based on the measured driving frequency.

As described above, according to this embodiment, it is possible to detect an input error or a load error at low costs by detecting the driving frequency of the isolation convertor 105 and discriminating between the input error and the load error through execution of the sequence.

Now, a second embodiment of the present invention is described.

[Isolation Convertor 104]

Figure 7A:
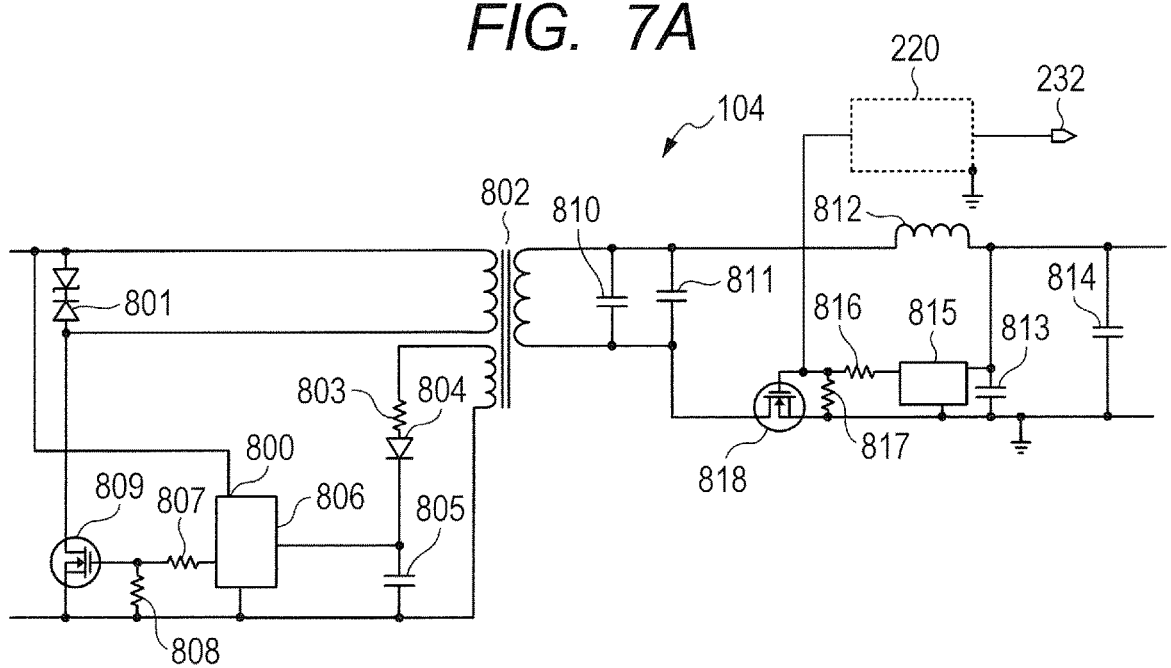
FIG. 7A is a diagram for illustrating a convertor according to the second embodiment.

In the second embodiment, a description is given on the assumption that the isolation convertor 104 serving as a second convertor is a QR convertor and the isolation convertor 105 is stopped in a sleep state and only the isolation convertor 104 is driven. FIG. 7A is an illustration of details of the isolation convertor 104 according to this embodiment. The isolation convertor 104 includes a transformer 802 configured to isolate the primary side from the secondary side. When the voltage of the primary smoothing capacitor 101 rises, a current is drawn from an activation terminal 800 and a QR control unit 806 is activated. The QR control unit 806 is configured to control the switching operation of a field effect transistor (hereinafter referred to as "FET") 809 serving as a first switching element via resistors 807 and 808 and to supply or cut off electric power to/from the primary side of the transformer 802. When a switching current flows through a primary winding of the transformer 802 through a switching operation of the FET 809, a voltage generated in an auxiliary winding is rectified and smoothed by a resistor 803, a rectifier 804, and a capacitor 805. The rectified and smoothed voltage is supplied to the QR control unit 806, and the switching operation of the FET 809 controlled by the QR control unit 806 is continued.

A power zener diode (trankiller) 801 is connected to a drain terminal of the FET 809 so that the FET 809 is not damaged due to a rising voltage at a time when the FET 809 is set to an off state. The secondary side of the isolation convertor 104 adopts a synchronous rectification system, and a synchronous rectification control unit 815 serving as a control unit carries out the switching operation of an FET 818 serving as a second switching element via resistors 816 and 817. The synchronous rectification control unit 815 turns the FET 818 off while the FET 809 is on. In contrast, the synchronous rectification control unit 815 turns the FET 818 on while the FET 809 is off and carries out a flyback operation. Turning the FET 818 on causes a current flowing through the secondary side of the transformer 802 to be smoothed by capacitors 810, 811, and 814, and an inductor 812. The synchronous rectification control unit 815 and the FET 818 function as a smoothing unit configured to smooth a voltage induced in a secondary winding of the transformer 802.

A power source voltage of the synchronous rectification control unit 815 is supplied by causing a current from a latter part of the inductor 812 to charge the capacitor 813. A gate terminal serving as a control terminal of the FET 818 is connected to the pulse generation circuit 220 for frequency detection, to thereby detect the driving frequency of the isolation convertor 104. The internal parts of the pulse generation circuit 220 may be the same as those of FIG. 2A. Alternatively, the diode 221 may be omitted from the parts of FIG. 2A.

[Pulse Generation Circuit 220]

Figure 7B:
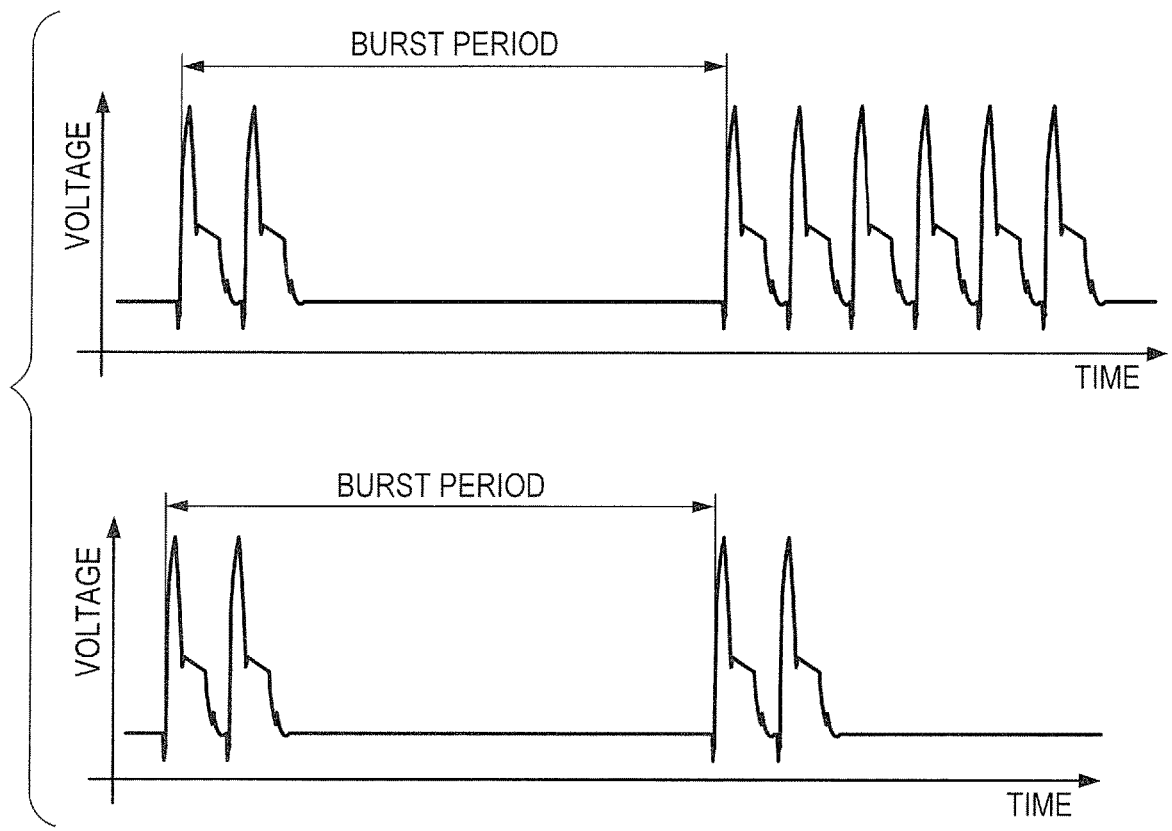
FIG. 7B is graphs for showing an example of a waveform of input to the driving frequency detection circuit in a sleep state according to the second embodiment.

FIG. 7B is an illustration of an example of a waveform of input to the pulse generation circuit 220 according to this embodiment. As in a sleep state, when the load of the printer 1 is light, attention needs to be paid to frequency detection of the isolation convertor 104. This is because the isolation convertor 104 may be carrying out a burst operation. In this case, in FIG. 7B, the horizontal axis represents time, and the vertical axis represents a voltage input to the pulse generation circuit 220, namely, a voltage of a gate terminal of the FET 818.

For example, when a rising edge of an input waveform is used when the driving frequency is detected by the pulse generation circuit 220, there are known methods of measuring an interval of the rising edges or measuring the number of rising edges within a certain period. In that case, for example, the measurement unit needs to be adjusted to a burst period (namely, burst frequency). As shown in FIG. 7B, the burst period in this context refers to an interval from when a first wave of an input waveform after a switching operation is stopped rises until when a first wave of an input waveform after a next switching operation is stopped rises. The number of times of rising during a burst period changes depending on the output voltage. In a sleep state for carrying out a burst operation, a spurious frequency, which is acquired from the number of switching operations during a predetermined period longer than a burst period, can also be defined. Thus, in a sleep state, an average frequency and a variation width of a frequency are acquired for each of two frequencies, namely, the burst frequency acquired from the burst period and the spurious frequency described above, and those values are compared to allowable values to detect an error. Also in a sleep state, similarly to a print state or a stand-by state, the driving frequencies (burst frequency and spurious frequency) of the isolation convertor 105 in a sleep state of the printer 1 are stored in a memory (e.g., ROM 108a) serving as a memory unit of the driving frequencies. With this, it is possible to improve the determination accuracy of the input voltage. In the following, a description is given by referring to the burst frequency and the spurious frequency simply as the driving frequency.

[Error Detection in Sleep State]

Figure 8:
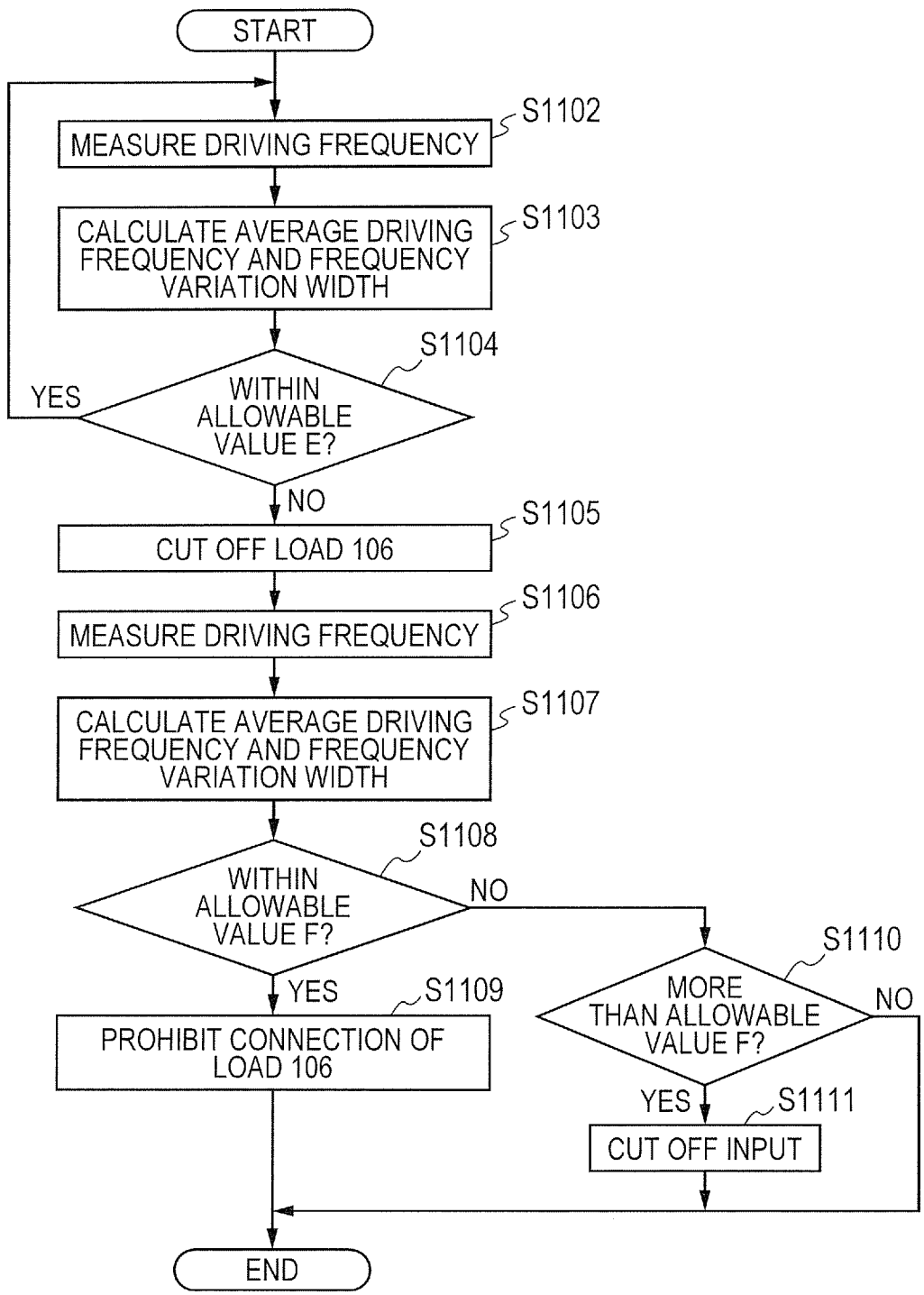
FIG. 8 is a flowchart for illustrating error detection processing in a sleep state according to the second embodiment.

Now, a description is given of a procedure of detecting an error of input to the printer 1 or a load error to be carried out by the CPU 108 in a sleep state with reference to FIG. 8. When the CPU 108 shifts to a sleep state, the CPU 108 stops the operation of the isolation convertor 105, and executes processing from S1102. In S1102, the CPU 108 measures the driving frequency of the isolation convertor 104 based on the driving frequency signal from the pulse generation circuit 220 under a state where the load 106, which is a third load, and the load 107, which is a fourth load, are connected to the isolation convertor 104. In S1103, the CPU 108 calculates the average driving frequency $f_{ave}$ and the frequency variation width fΔ in a state where the load 106 and the load 107 are connected to the isolation convertor 104 from the measurement result of S1102 with use of Expression (1) to Expression (3). In S1104, the CPU 108 determines whether or not both of the average driving frequency $f_{ave}$ and the frequency variation width fΔ acquired in S1103 fall within allowable values E, which are fifth ranges, respectively.

In S1104, when the CPU 108 determines that both of the average driving frequency $f_{ave}$ and the frequency variation width fΔ fall within the allowable values E, respectively, the CPU 108 returns the processing to S1102. In S1104, when the CPU 108 determines that at least one of the average driving frequency $f_{ave}$ and the frequency variation width fΔ does not fall within the allowable value E, the CPU 108 advances the processing to S1105. In S1105, the CPU 108 cuts off the load 106. Then, in S1106, the CPU 108 measures the driving frequency of the isolation convertor 104 under a state where the load 107 is connected. In S1107, the CPU 108 calculates the average driving frequency $f_{ave}$ and the frequency variation width fΔ in a state where only the load 107 is connected to the isolation convertor 104 from the measurement result of S1106, with use of Expression (1) to Expression (3).

In S1108, the CPU 108 determines whether or not both of the average driving frequency $f_{ave}$ and the frequency variation width fΔ acquired in S1107 fall within allowable values F, which are sixth ranges, respectively. In S1108, when the CPU 108 determines that both of the average driving frequency $f_{ave}$ and the frequency variation width fΔ fall within the allowable values F, respectively, the CPU 108 advances the processing to S1109. In this case, the CPU 108 determines that an error in the load 106 results in the determination in S1104 that the average driving frequency $f_{ave}$ and the frequency variation width fΔ in the state where the load 106 and the load 107 are connected do not fall within the allowable values E, respectively. In S1109, the CPU 108 prohibits connection of the load 106, and ends the processing. The CPU 108 may alert the user of the load error through, for example, the operational panel (not shown) in addition to prohibiting connection of the load 106.

In S1108, when the CPU 108 determines that at least one of the average driving frequency $f_{ave}$ and the frequency variation width fΔ acquired in S1107 does not fall within the allowable value F, the CPU 108 advances the processing to S1110. In S1110, the CPU 108 determines whether or not at least one of the average driving frequency $f_{ave}$ and the frequency variation width fΔ is larger than (exceeds) the maximum value (e.g., Fmax, which is a third value) of the allowable value F. In S1110, when the CPU 108 determines that at least one of the average driving frequency $f_{ave}$ and the frequency variation width fΔ is larger than the maximum value of the allowable value F (Fmax<$f_{ave}$ or/and Fmax<fΔ), the CPU 108 advances the processing to S1111. In this case, the CPU 108 determines that the error is an error of input to the printer 1, and cuts off input to the printer 1 by turning the switch 102 off via the signal line 111 in S1111.

In S1110, when the CPU 108 determines that at least one of the average driving frequency $f_{ave}$ and the frequency variation width fΔ is not larger than the maximum value of the allowable value F, that is, is smaller than the minimum value of the allowable value F (e.g., Fmin), the CPU 108 ends the processing. The CPU 108 may include a counter configured to store the fact that "No" is determined in S1110, namely, a detection count, and increment the counter by one. For example, even when the CPU 108 determines that at least one of the average driving frequency $f_{ave}$ and the frequency variation width fΔ is smaller than the minimum value of the allowable value F, the CPU 108 may, for example, inform the user of the fact when the detection count is equal to or more than a predetermined count by referring to the detection count. Further, in a case of a configuration in which the load 107 includes the CPU 108 and other loads, and the loads other than the CPU 108 can be cut off, detection of a load error may be carried out for the loads other than the CPU 108 using the method described above.

The allowable values E and F are set as follows. Regarding the allowable value E, the driving frequency of the isolation convertor 105 when a load corresponding to the loads 106 and 107 in a sleep state of the printer 1 is connected is measured in advance under a state where there is no input error or load error. Then, the ranges (namely, allowable values E) in normal states of the average driving frequency $f_{ave}$ and the frequency variation width fΔ are stored in a memory unit, for example, the ROM 108a, based on the measured driving frequency. Similarly, regarding the allowable value F, the driving frequency of the isolation convertor 105 when a load corresponding to the load 107 is connected is also measured, and the allowable value F is stored in, for example, the ROM 108a, based on the measured driving frequency.

The allowable values A to F, which are information relating to the driving frequency of a convertor, are ranges of the driving frequency that can be taken by the isolation convertor 104 or the isolation convertor 105 in states corresponding to printing, stand-by, and sleeping and in connection states of loads corresponding to respective loads. The allowable values A to F may be set in design stages as in the first and second embodiments, or may be set at the time of shipment from a factory. Further, in the state where the apparatus is installed, an input voltage may be detected by an input voltage detection unit (not shown) configured to detect an AC voltage of the AC power supply 100 and the preset allowable values A to F may be corrected depending on the input voltage. Then, at the time of determination of FIG. 3, FIG. 4, FIG. 6, and FIG. 8, the corrected allowable values A to F may be used.

Further, the configuration of a convertor configured to convert the voltage rectified and smoothed by the rectifier 103 and the primary smoothing capacitor 101 into an output voltage and supply the output voltage to the loads 106 to 110 is not limited to those of the isolation convertors 104 and 105 described above. The present invention can be applied to a convertor configured to change the output voltage through control of the driving frequency thereof.

As described above, according to this embodiment, it is possible to detect an input error or a load error at low costs by detecting the driving frequency of the isolation convertor 104 and discriminating between the input error and the load error through execution of the sequence.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-004746, filed Jan. 13, 2016, which is hereby incorporated by reference herein in its entirety.

What is claimed is:

1. A power supply apparatus comprising a convertor having a transformer configured to isolate a primary side of the transformer from a secondary side of the transformer and being configured to convert an input voltage into an output voltage different from the input voltage and to supply the output voltage to a load, the power supply apparatus being configured to change the output voltage through control of a driving frequency of the transformer, wherein the power supply apparatus further includes:
   a generation circuit configured to generate a pulse signal based on a voltage induced on the secondary side of the transformer;
   a detection circuit configured to detect the driving frequency based on the pulse signal generated by the generation circuit;
   a memory configured to store information set in advance on the driving frequency; and
   a determination circuit configured to determine one of an error of the input voltage and an error of the load based on a result of comparing, to a piece of the information stored in the memory, a driving frequency detected by the detection circuit under a state where the load is connected to the convertor, and based on a result of comparing, to a piece of the information stored in the memory, a driving frequency detected by the detection circuit under a state where the load is not connected to the convertor.

2. A power supply apparatus according to claim 1, wherein the load comprises a first load and a second load, wherein the convertor comprises a first convertor to which the first load and the second load are connected,
   wherein the information on the driving frequency stored in the memory comprises a first range of the driving frequency that is taken by the first convertor when the first load is connected to the first convertor, and
   wherein the detection circuit is configured to, when the determination circuit determines that a driving frequency detected by the detection circuit under a state where the first load is connected to the first convertor and the second load is not connected to the first convertor does not fall within the first range, detect a driving frequency under a state where the first load is cut off from the convertor and the first load is not connected to the convertor.

3. A power supply apparatus according to claim 2, wherein the information on the driving frequency stored in the memory comprises a second range of the driving frequency that is taken by the first convertor when the load corresponding to the first load and the second load are not connected to the first convertor,
   wherein the determination circuit is configured to determine an error of the first load when determining that a driving frequency detected by the detection circuit under a state where the first load and the second load are not connected to the first convertor falls within the second range, and
   wherein the determination circuit is configured to determine the error of the input voltage when determining that a driving frequency detected by the detection circuit under a state where the first load and the second load are not connected to the first convertor does not fall within the second range.

4. A power supply apparatus according to claim 3, wherein the determination circuit is configured to prohibit connection of the first load to the first convertor when determining the error of the first load.

5. A power supply apparatus according to claim 3, further comprising a connection portion provided between an AC power supply apparatus and the convertor, wherein the determination circuit is configured to, when determining the error of the input voltage: stop the first convertor in one of a case where a difference between a maximum value and a minimum value among driving frequencies detected by a plurality of the detection circuits does not fall within the second range, and a case where an average value of the driving frequencies detected by the plurality of the detection circuits is smaller than a first value corresponding to the second range; and
   cut off the connection portion when the average value is larger than a second value corresponding to the second range.

6. A power supply apparatus according to claim 3, further comprising a connection portion provided between an AC power supply apparatus and the convertor,
   wherein the determination circuit is configured to, when determining the error of the input voltage, cut off the connection portion when the driving frequency detected by the detection circuit is larger than a value corresponding to the second range.

7. A power supply apparatus according to claim 2, wherein the information on the driving frequency stored in the memory comprises a second range of the driving frequency that is taken by the first convertor when the load corresponding to the first load and the second load are connected to the first convertor, and wherein the determination circuit is configured to prohibit the first load and the second load from being active when determining that a driving frequency detected by the detection circuit under a state where the first load and the second load are connected to the first convertor does not fall within the second range.

8. A power supply apparatus according to claim 7, wherein the information on the driving frequency stored in the memory unit comprises a third range of the driving frequency that is taken by the first convertor under a state corresponding to a time when calibration of the second load is carried out, and wherein the determination circuit is configured to:
- set a flag when prohibiting the first load and the second load from being active;
- prohibit connection of the second load to the first convertor when the first load and the second load are prohibited from being active by the flag and a driving frequency detected by the detection circuit under a state where the calibration is carried out is determined not to fall within the third range; and
- release prohibition of the first load and the second load being active when the driving frequency detected by the detection circuit under the state where the calibration is carried out is determined to fall within the third range.

9. A power supply apparatus according to claim 2, wherein the convertor comprises:
the transformer comprising a primary winding and a secondary winding;
a switching circuit configured to carry out a switching operation at the driving frequency and to perform one of supplying and cutting off electric power to the primary winding; and
a rectifier configured to rectify a voltage induced in the secondary winding, and
wherein the generation circuit is configured to generate the pulse signal based on a voltage prior to the rectification by the rectifier.

10. A power supply apparatus according to claim 1, wherein the convertor comprises:
the transformer comprising a primary winding and a secondary winding;
a first switching circuit configured to carry out a switching operation at the driving frequency and to perform one of supplying and cutting off electric power to the primary winding; and a rectifier unit comprising:
a second switching circuit configured to rectify a voltage induced in the secondary winding; and
a control unit, which is connected to a control terminal of the second switching circuit and is configured to control the second switching circuit in accordance with the switching operation of the first switching circuit, and
wherein the generation circuit is connected to the control terminal of the second switching circuit and is configured to generate the pulse signal based on a voltage of the control terminal.

11. An image forming apparatus, comprising: an image forming circuit configured to form an image on a recording material; and
a power supply apparatus for supplying power to the image forming apparatus, the power supply apparatus comprising a convertor having a transformer configured to isolate a primary side of the transformer from a secondary side of the transformer and being configured to convert an input voltage into an output voltage different from the input voltage and to supply the output voltage to a load, the power supply apparatus being configured to change the output voltage through control of a driving frequency of the transformer,
wherein the power supply apparatus further includes: a generation circuit configured to generate a pulse signal based on a voltage induced on the secondary side of the transformer;
a detection circuit configured to detect the driving frequency based on the pulse signal generated by the generation circuit;
a memory unit configured to store information set in advance on the driving frequency; and
a determination circuit configured to determine one of an error of the input voltage and an error of the load based on a result of comparing, to a piece of the information stored in the memory, a driving frequency detected by the detection circuit under a state where the load is connected to the convertor, and based on a result of comparing, to a piece of the information stored in the memory, a driving frequency detected by the detection circuit under a state where the load is not connected to the convertor.

12. An image forming apparatus according to claim 11, further comprising a controller configured to control the image forming circuit,
wherein the power supply apparatus is configured to supply electric power to the controller.

* * * * *